United States Patent
Shim et al.

(10) Patent No.: US 10,050,289 B2
(45) Date of Patent: Aug. 14, 2018

(54) GAS AND CONDENSED WATER DISCHARGE SYSTEM FOR FUEL CELL SYSTEM AND CONTROL METHOD THEREOF

(71) Applicants: Hyundai Motor Company, Seoul (KR); Kia Motors Corporation, Seoul (KR)

(72) Inventors: Hyosub Shim, Gyeonggi-do (KR); Sekwon Jung, Seoul (KR); Bukil Kwon, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/678,292

(22) Filed: Aug. 16, 2017

(65) Prior Publication Data

US 2017/0346112 A1    Nov. 30, 2017

Related U.S. Application Data

(62) Division of application No. 14/556,102, filed on Nov. 29, 2014, now Pat. No. 9,748,586.

(30) Foreign Application Priority Data

Sep. 22, 2014    (KR) .................. 10-2014-0126188

(51) Int. Cl.
*H01M 8/04119*    (2016.01)
*H01M 8/04223*    (2016.01)
(Continued)

(52) U.S. Cl.
CPC .... *H01M 8/04156* (2013.01); *H01M 8/04231* (2013.01); *H01M 8/04492* (2013.01); *H01M 8/04619* (2013.01); *H01M 8/04761* (2013.01); *H01M 2250/20* (2013.01); *Y02P 70/56* (2015.11); *Y02T 90/32* (2013.01)

(58) Field of Classification Search
CPC ...................... H01M 8/04231; H01M 8/04141
See application file for complete search history.

(56) References Cited

U.S. PATENT DOCUMENTS

2012/0148927 A1    6/2012    Jeon et al.

FOREIGN PATENT DOCUMENTS

JP    2002-198083 A    7/2002
JP    2002-313403        10/2002
(Continued)

*Primary Examiner* — Olatunji A Godo
(74) *Attorney, Agent, or Firm* — Mintz Levin Cohn Ferris Glovsky and Popeo, P.C.; Peter F. Corless

(57) ABSTRACT

Disclosed are a system and a method for discharging a gas and condensed water for a fuel cell system. The gas and condensed water discharge system comprises: a fuel cell stack that includes cathodes and anodes and produces an electric current by an electrochemical reaction of oxygen and hydrogen; a water trap that temporarily stores gases and water discharged from anodes of the stack and condensed water; an integrated drain valve that is mounted at the water trap so as to generate the gas flow path for gases and the condensed water passing through a discharge portion of the integrated drain valve and discharged out of the water trap; and a controller that discharges the gases and the condensed water by opening and closing the integrated drain valve.

7 Claims, 7 Drawing Sheets

(51) Int. Cl.
*H01M 8/04746* (2016.01)
*H01M 8/04537* (2016.01)
*H01M 8/04492* (2016.01)

(56) References Cited

FOREIGN PATENT DOCUMENTS

| | | |
|---|---|---|
| KR | 10-2009-0009343 A | 1/2009 |
| KR | 10-1013857 B1 | 2/2011 |
| KR | 10-2014-0021175 | 2/2014 |
| KR | 10-2014-0055753 | 5/2014 |

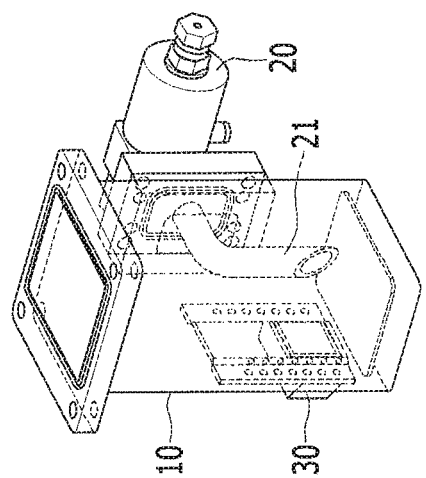
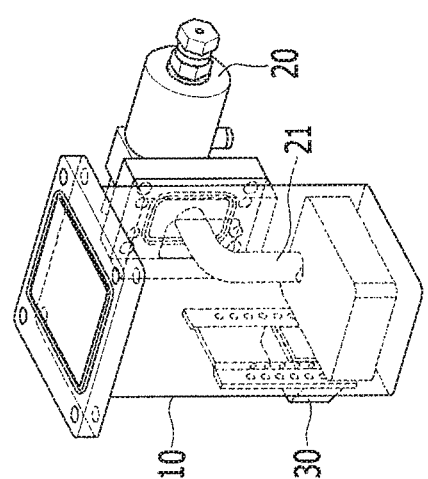
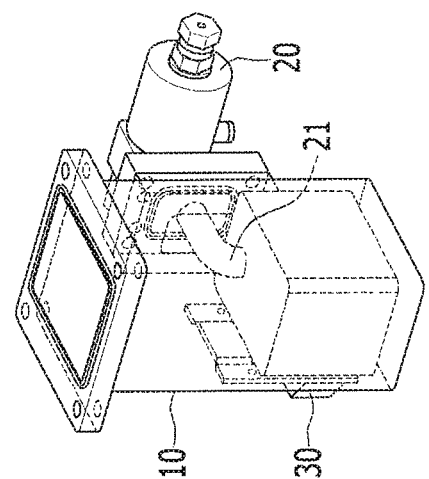

RELATED ART

GAS AND CONDENSED WATER DISCHARGE SYSTEM FOR FUEL CELL SYSTEM AND CONTROL METHOD THEREOF

CROSS-REFERENCE TO RELATED APPLICATION

This Application is a Division of application Ser. No. 14/556,102 filed on Nov. 29, 2014. Application Ser. No. 14/556,102 which claims priority to and the benefit of Korean Patent Application No. 10-2014-0126188 filed in the Korean Intellectual Property Office on Sep. 22, 2014, the entire contents of which are incorporated herein by reference.

TECHNICAL FIELD

The present invention relates to a system and a method for discharging gas and condensed water for a fuel cell system. Particularly, the gas and condensed water may be discharged from a fuel cell system through a single discharging portion.

BACKGROUND

A fuel cell system is a power generation system that receives hydrogen as a fuel and oxygen in the air and generates electrical energy by an electrochemical reaction between hydrogen and oxygen in a fuel cell.

For example, a fuel cell system is applied to a fuel cell vehicle and operates the vehicle by powering an electric motor by electrical energy produced by a fuel cell.

In general, such fuel cell system includes a fuel cell stack which is an assembly of fuel cells each including of an cathode and a anode, an air supplier for supplying air to the cathode, and a hydrogen supplier for supplying hydrogen to the anode.

When the fuel cell system generates power, the cathode produce water and a portion of the water is moved to the anodes through an electrolyte layer of the stack due to concentration differences.

Accordingly, gases including unreacted hydrogen and water coming from the cathodes are discharged from the anodes of the fuel cells. The gases and the water are re-supplied to the fuel cell stack through a hydrogen recirculation device, and condensed water is discharged from the anodes after being temporarily stored in a water trap, and is later discharged to the outside of the fuel cell stack.

The gases including unreacted hydrogen are generally purged when recirculating the gases to remove impurities besides hydrogen discharged from the anodes of the fuel cell stack. As a result, this purging increases the concentration of hydrogen supplied to the anodes and activates electrochemical reactions in the stack.

If the condensed water in the anodes is not properly discharged to the outside, the stack may be filled with condensed water and hydrogen may not move to the cathodes through the electrolyte layer. This may cause reduced output and serious problems in driving the vehicle. As such, the discharge of condensed water as well as the purging of hydrogen-containing gases may be critical for operating the fuel cell system.

Typically, each of a purge valve and a drain valve is applied to a water trap that connects a gas and water discharge line which is from the anodes of a fuel cell stack and a hydrogen recirculation line or to the front and back end of the water trap. These valves may perform gas purging and discharging condensed water independently. In other words, the purge line and the drain line are separated from each other.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a system and a method for discharging a gas and condensed water from a fuel cell system by continuously purging recirculated gases and discharging condensed water using a single drain valve for discharging condensed water, thereby reducing cost and weight of the fuel cell system.

In an exemplary embodiment, a system for discharging gases and condensed water from a fuel cell system may include: a fuel cell stack that includes cathodes and anodes and produces an electric current by an electrochemical reaction of oxygen and hydrogen; a water trap that temporarily stores gases and water discharged from anodes of the fuel cell stack and condensed water; an integrated drain valve that is mounted at the water trap such that the gases and the condensed water pass through a discharging portion of the integrated drain valve and be discharged out of the water trap; and a controller that control discharging of the gases and the condensed water by opening and closing the integrated drain valve.

The controller may recognize an integrated current value by integrating a current value produced by the stack or by directly receiving an integrated current value signal directly.

The gas and condensed water discharge system for the fuel cell system may further include a water level sensor that is mounted in the water trap and senses the condensed water.

In particular, in the water trap, a section where level of the condensed water drops may include a section where both the gases and the condensed water may be discharged through the discharge portion.

An inlet surface of the discharge portion of the integrated drain valve may be parallel or substantially parallel with a level surface of the condensed water.

The controller may open the integrated drain valve when an integrated current value which is an integrated value of a current produced by the stack is equal to or greater than a predetermined value. The controller may close the integrated drain valve by determining whether to close the integrated drain valve using at least one of an output signal from the water level sensor and a predetermined opening time.

Alternatively, the controller may open the integrated drain valve according to an output signal from the water level sensor and close the integrated drain valve by determining whether to close the integrated drain valve using at least one of an output signal from the water level sensor and a predetermined opening time.

In an exemplary embodiment, a system for discharging a gas and condensed water from cell may include: a fuel cell stack that includes cathodes and anodes and produces an electric current by an electrochemical reaction of oxygen and hydrogen; a water trap that temporarily stores gases and water discharged from anodes of the stack and condensed water; an integrated drain valve that is mounted at the water trap such that the gases and the condensed water may pass through a discharge portion and be discharged out of the water trap; and a controller that controls discharging of the gases and the condensed water by opening and closing the integrated drain valve.

In an exemplary embodiment, the method of controlling the system may comprise: at least one of two steps of determining by the controller whether or not an integrated current value, which is an integrated value of a current produced by the stack, is equal to or greater than a predetermined value; and determining by the controller whether or not the condensed water is sensed according to an output signal from the water level sensor. The method may further include a step of opening the integrated drain valve by the controller if the integrated current value is equal to or greater than the predetermined value. Alternatively, the method may further include a step of opening the integrated drain valve by the controller is the controller determines that the condensed water is sensed.

In addition, the method may further include: a step of determining by the controller whether a predetermined opening time of the integrated drain valve has elapsed; and a step of closing the integrated drain valve by the controller when the opening time has elapsed.

When the integrated current value is equal to or greater than the predetermined value and the condensed water is sensed, the integrated drain valve may be opened and the integrated drain valve may be subsequently closed after an elapse of a predetermined first opening time since the condensed water is not sensed after the opening of the integrated drain valve.

When the integrated current value is equal to or greater than the predetermined value and the condensed water is not sensed, the integrated drain valve may be opened and the integrated drain valve may be subsequently closed after an elapse of a predetermined second opening time since the opening of the integrated drain valve.

When the condensed water is sensed, the integrated drain valve may be opened and the integrated drain valve may be subsequently closed after an elapse of a predetermined third opening time since the opening of the integrated drain valve.

BRIEF DESCRIPTION OF THE DRAWINGS

FIGS. 2A-2C show an exemplary process for discharging gas and condensed water of an exemplary system according to an exemplary embodiment of the present invention.

Figure 1A:
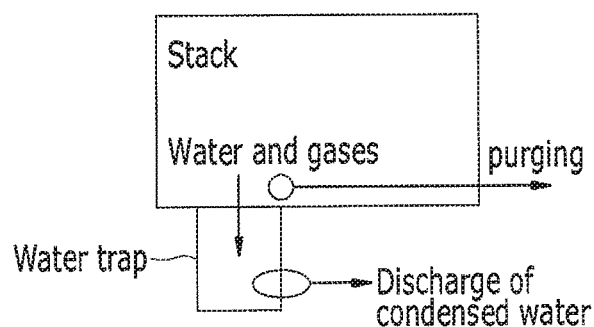
FIGS. 1A-1B compares a structure of a conventional gas and condensed water discharge system in the related arts and an exemplary structure of a gas and condensed water discharge system according to an exemplary embodiment of the present invention.

Reference numerals set forth in the FIGS. 1-7 include reference to the following elements as further discussed below:

10: water trap
20: integrated drain valve
21: discharge portion
30: water level sensor
40: controller
50: electric current detector

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings so that those of ordinary skill in the art easily carry out the present invention. One skilled in the art will recognize that the present invention may be implemented in various different forms and should not be construed as being limited to the embodiments described herein.

Figure 1B:
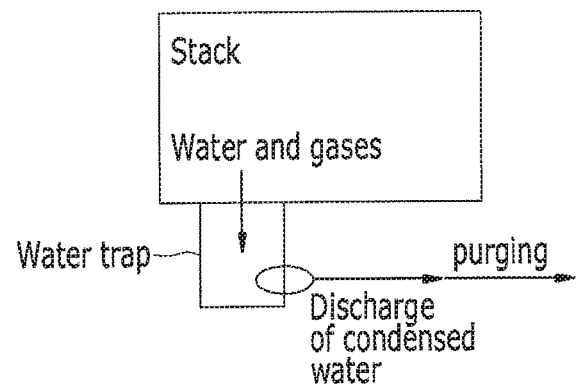

FIGS. 1A-1B illustrate the structure of a conventional system for discharging gas and condensed water and an exemplary structure of an exemplary system for discharging gas and condensed water according to an exemplary embodiment of the present invention.

In both of the conventional t shown in FIG. 1A and the exemplary embodiment shown in FIG. 1B, gases including hydrogen and water discharged from the anodes of a fuel cell stack may pass through a water trap or may be temporarily stored in the water trap.

In the conventional art shown in FIG. 1A, the gases and water vapor may be purged through a purge valve before going into the water trap in order to remove impurities other than hydrogen. Condensed water flowing into the water trap or condensed water obtained while passing through the water trap may be temporarily stored and subsequently discharged through a drain valve located below the water trap base on a discharge period. Accordingly, a gas purge line and a condensed water drain line are separated from each other.

The term "purge" as used herein refers to "discharge" and in particular, is used to indicate the discharge of gases through a valve.

On the other hand, in the system for discharging gas and condensed water according to an exemplary embodiment of the present invention, gases and water drawn into the water trap may be continuously purged or discharged through one discharge line. Accordingly, the purge valve and the drain valve may be functionally integrated into a single valve, unlike the conventional system in the related arts.

FIGS. 2A-2C show an exemplary process of an exemplary system for discharging a gas and condensed water according to an exemplary embodiment of the present invention.

As shown in FIGS. 1A-1B and FIGS. 2A-2C, the system for discharging gas and condensed water according to an exemplary embodiment of the present invention may include: a fuel cell stack including cathodes and anodes that produces an electric current by an electrochemical reaction of oxygen and hydrogen; a water trap 10 that temporarily stores gases and water discharged from the anodes of the stack and condensed water; an integrated drain valve 20 that is mounted at the water trap 10 such that the gases and the condensed water pass through a same discharge portion 21 and are discharged out of the water trap 10; and a controller 40 (FIG. 6) configured to discharge the gases and the condensed water by opening and closing the integrated drain valve 20.

In particular, the system for discharging gas and condensed water according to an exemplary embodiment of the present invention may not include the conventional purge valve, but instead, may continuously purge gases discharged from the anodes of the stack and recirculated and discharge condensed water by using only the integrated drain valve 20.

In addition, the system for discharging gas and condensed water may further include a water level sensor 30 that is mounted on the water trap 10 and configured to sense the condensed water.

In the conventional system, when an integrated current value reaches a predetermined value, the purge valve may be opened for a predetermined period of time or for predetermined times to periodically purge the recirculated gases. The integrated current value is a value obtained by integrating a current produced by an electrochemical reaction of a fuel cell stack, of which unit is in coulomb (C).

Figure 6:
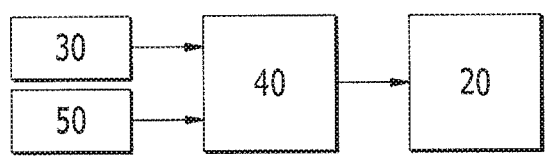
FIG. 6 shows an exemplary control apparatus of an exemplary system for discharging gas and condensed water according to an exemplary embodiment of the present invention.

The integrated current value may be calculated by the controller 40 by using a current detected by an electric current detector 50 (FIG. 6). Alternatively, the integrated current value may be obtained by the controller 40 receiving an integrated current value signal directly from the electric current detector 50.

In contrast, the system for discharging gas and condensed water may purge recirculated gases and discharge condensed water using only the drain valve, without using the purge valve, which may be describe in detail as follows.

As shown in FIG. 2A, when the integrated current value is equal to or greater than a predetermined value and the integrated drain valve 20 is opened, the condensed water in the water trap 10 may start to be discharged through the discharge portion 21 of the integrated drain valve 20.

When a portion of the water level sensor 30 which may not sense the condensed water starts to occur as shown in FIG. 2B in dropping of level of the condensed water, an output signal from the water level sensor 30 may start to change.

Figure 3:
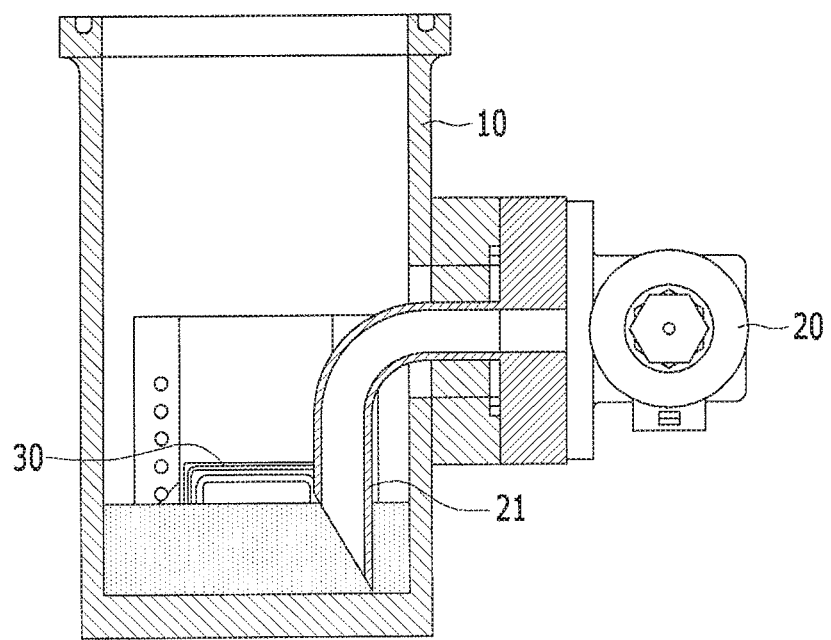
FIG. 3 shows a side view of an exemplary system for discharging gas and condensed water according to an exemplary embodiment of the present invention.

The mounting height of the water level sensor 30 may be adjusted such that an upper end of a rectangular water sensing portion of the water level sensor 30 may be placed as high as an upper edge of an inlet of the discharge portion 21. Accordingly, the point at which the output signal from the water level sensor 30 starts to change may be detected, and thus the condensed water level may be detected to reach as high as the upper edge of the inlet of the discharge portion 21. Alternatively, the upper end of the water sensing portion of the water level sensor 30 may be placed slightly higher than the upper edge of the inlet of the discharge portion 21 such that a distinctive change in the output signal may be sensed. Such exemplary embodiment is shown in FIG. 3.

When the condensed water level becomes lower than the upper edge of the inlet of the discharge portion 21, recirculated gases including hydrogen in the water trap 10 may start to be discharged together with the condensed water through the discharge portion 21. The gases may also include water vapor. Subsequently, when the condensed water level becomes lower than the lower edge of the inlet of the discharge portion 21 as shown in FIG. 2C, the condensed water may not be discharged further and only the gases may be purged.

Accordingly, a section where the level of the condensed water in the water trap 10 drops may include a section where both the gases and the condensed water are discharged through the discharge portion 21. In particular, the section where both the gases and the condensed water are discharged through the discharge portion 21 may be formed due to a shape of the inlet of the discharge portion 21 which may have a height.

Moreover, when an inlet surface of the discharge portion 21 is configured to be parallel with a condensed water level surface, discharging sections of the gases and the condensed water of the gas and condensed water discharge system may be separated from each other.

In this case, the section where both the gases and the condensed water are discharged may not be generated.

The controller 40 of the system for discharging the gas and condensed water may discharge condensed water for a period of a predetermined integrated current value A, and the discharge time may vary with the volume of stored condensed water such as the condensed water level.

For example, when the integrated current value A is equal to or greater than a predetermined value of 1000 C and the controller 40 determines that condensed water is sensed according to an output signal from the water level sensor 30, the integrated drain valve 20 may be opened. The integrated drain valve 30 may subsequently be closed according to a change in the output signal from the water level sensor 30 after a predetermined first opening time of X1 seconds since the controller 40 determines that the condensed water is not sensed. In this example, both the change in the output from the water level sensor 30 and the predetermined opening time X1 may be used for determining whether to close the integrated drain valve 20.

On the other hand, when the integrated current value A is equal to or greater than a predetermined value of 1000 C and the controller 40 determines that the condensed water is not sensed according to an output signal from the water level sensor 30, the integrated drain valve 20 may be opened for purging recirculated gases. The integrated drain valve 20 may be subsequently closed after a predetermined second opening time of X2 seconds since it is opened. In this example, only the predetermined opening time X2 may be used for determining whether to close the integrated drain valve 20.

In an exemplary embodiment, only the output signal from the water level sensor 30 may be used for determining whether to close the integrated drain valve 20. When the integrated current value is equal to or greater than A, the integrated drain valve 20 may be opened, and when it is determined according to an output signal from the water level sensor 30 that the condense water level becomes lower than the lower edge of the inlet of the discharge portion 21 by a predetermined length, the integrated drain valve 20 may be closed. In particular, when determining whether to close the integrated drain valve 20, whether a predetermined opening time has elapsed or not may not be considered.

In yet another example, the integrated drain valve 20 may be opened according to an integrated current value without using an output signal from the water level sensor 30 at all and may be subsequently closed after the elapse of a predetermined opening time. When the integrated current value is equal to or greater than A, condensed water may be sensed by the water level sensor 30, the condensed water level may remain almost constant, and an opening time optimal for both the discharge of the condensed water and the purging of recirculated gases may be determined in advance by an experiment. In addition, only a predetermined opening time may be used for determining whether to close the integrated drain valve 20.

In these four examples, when it is determined that condensed water is sensed, the inlet of the discharge portion 21 of the integrated drain valve 20 may be indicated to be soaked in water.

In a further example, the controller 40 may be configured to determine when to open the integrated drain valve 20 according to an output signal from the water level sensor 30 instead of an integrated current value. In this case, whether to close the integrated drain valve 20 may be determined using at least one among an output signal from the water level sensor 30 and a predetermined opening time. Such determination may be performed as described above in the above-explained four examples of opening the integrated drain valve 20 according to an integrated current value.

FIG. 3 shows a side view of an exemplary system for discharging gas and condensed water discharge system according to an exemplary embodiment of the present invention.

Referring to FIG. 3, when the condensed water level reaches the upper edge of the inlet of the discharge portion 21, the value of a signal output from the water level sensor 30 may change in accordance with the position in height of the water level sensor 30, since the area of contact between the water sensing portion of the water level sensor 30 and the condensed water may vary. From experiments, when the condensed water level reaches the upper edge of the inlet of the discharge portion 21, signal values output from the water level sensor 30 which may change with the position in height of the water level sensor 30 may be obtained. In addition, when the condensed water reaches the lower edge of the inlet of the discharge portion 21, signal values output from the water level sensor 30 may be obtained.

Accordingly, signal values output from the water level sensor 30 which corresponds to condensed water levels and changes with the mounting position of the water level sensor 30 may be obtained, and such information may be used as important data for the controller 40 to determine the opening and closing times of the integrated drain valve 20.

As shown in FIG. 3, the section where both the gases and the condensed water are discharged may be at the same height as the inlet of the discharge portion 21.

In the system for discharging the gas and condensed water according to various exemplary embodiments of the present invention, determining the opening time for purging recirculated gases in advance by an experiment in order to predetermine the opening times X1, X2 and the like of the integrated drain valve 20 may be critical, since a sufficient amount of time may be required to achieve a target purge volume L although the condensed water may be discharged as intended so long as the water level is properly lowered.

Figure 4:
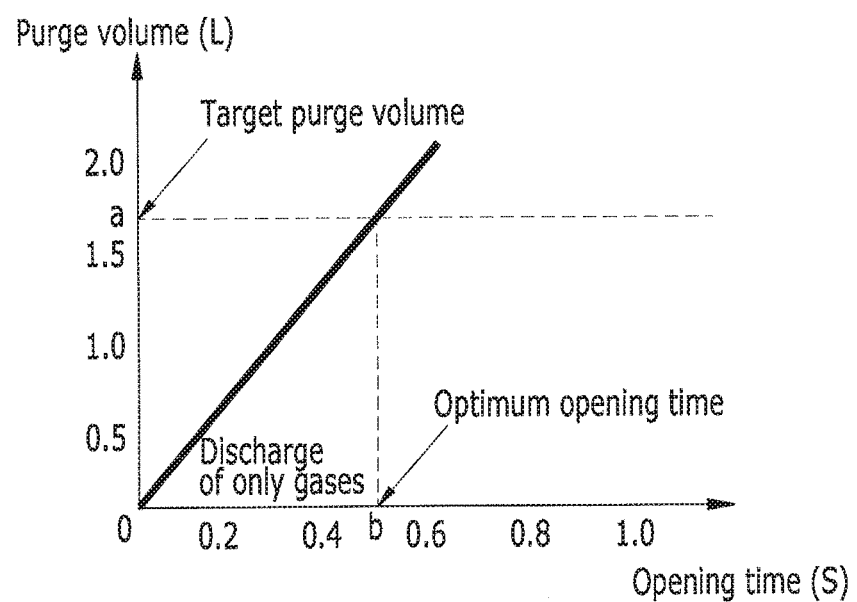
FIG. 4 is a graph showing a principle of determination of opening time of a purge value in a conventional system for discharging gas and condensed water according to the related art.

FIG. 4 is a graph showing a principle for determining the opening time of a purge value in the conventional gas and condensed water.

Figure 5:
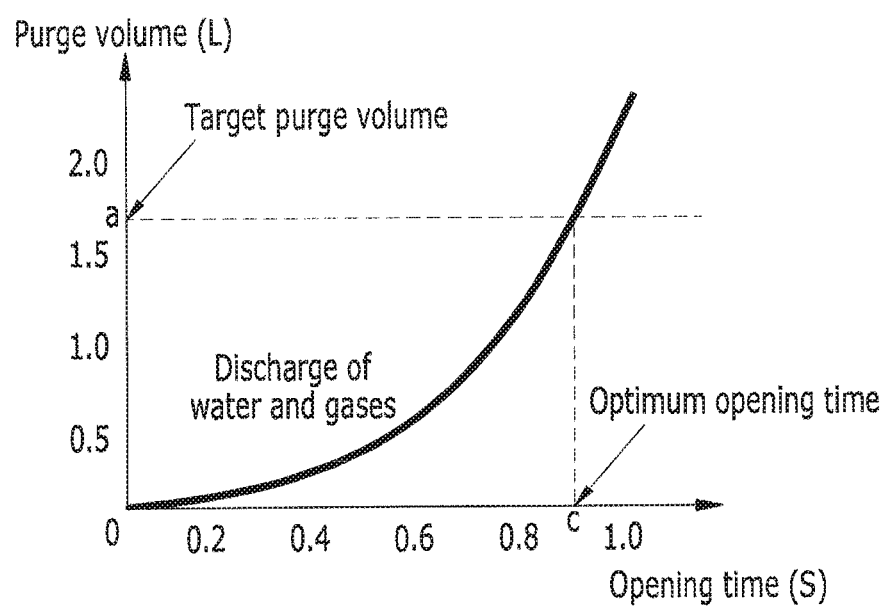
FIG. 5 is an exemplary graph showing an exemplary principle of determining opening time for purging recirculated gases in an exemplary system for discharging gas and condensed water according to an exemplary embodiment of the present invention.

FIG. 5 is an exemplary graph showing an exemplary principle of determining the opening time for purging recirculated gases in an exemplary system of discharging gas and condensed water according to an exemplary embodiment of the present invention.

In the conventional system, the purging of recirculated gases and the discharge of condensed water are separately carried out by using two valves. As such, the purge volume versus opening time graph is in a form of a straight line which indicates the purge volume increase over opening time, and as shown in FIG. 4, an opening time corresponding to a target purge volume may be selected as the optimum opening time.

In an exemplary system according to an exemplary embodiment of the present invention, the purging of gases and the discharge of condensed water may be carried out by using a single drain valve. As such, the shape of the graph as shown in FIG. 5 may depend on whether the section where the condensed water level drops includes a section where both the gases and the condensed water are discharged or not.

In particular, because both the condensed water and the gases are discharged, the purge volume increases as opening time graph increases on a gentle curve as shown in FIG. 5, and subsequently the graph may be in a form of a straight line that goes up over opening time after the condensed water level becomes lower than the lower edge of the inlet of the discharge portion 21. Accordingly, the optimum opening time which satisfies the target purge volume may increase somewhat. In the latter case, because the condensed water and the gases are separately discharged, the optimum opening time is determined in the same way as the purging of recirculated gases and the discharge of condensed water are carried out using two valves.

FIG. 6 illustrates an exemplary system for controlling discharging the gas and condensed water according to an exemplary embodiment of the present invention.

The apparatus of controlling discharging the gas and condensed water according to an exemplary embodiment of the present invention may include: an integrated drain valve 20; a water level sensor 30; an electric current detector 50; and a controller 40. The control logic of the integrated drain valve 20, the method of determination by the controller 40 according to an output signal from the water level sensor 30, and the logic of use of an integrated current value by the electric current detector 50 and the controller 40 may be used as described above.

The controller 40 may be configured to perform a calculation or determination upon receipt of signals from the water level sensor 30 and the electric current detector 50 and may be configured to send an output signal to the integrated drain valve 20 according to a predetermined control logic to open or close the integrated drain valve 20.

Figure 7:
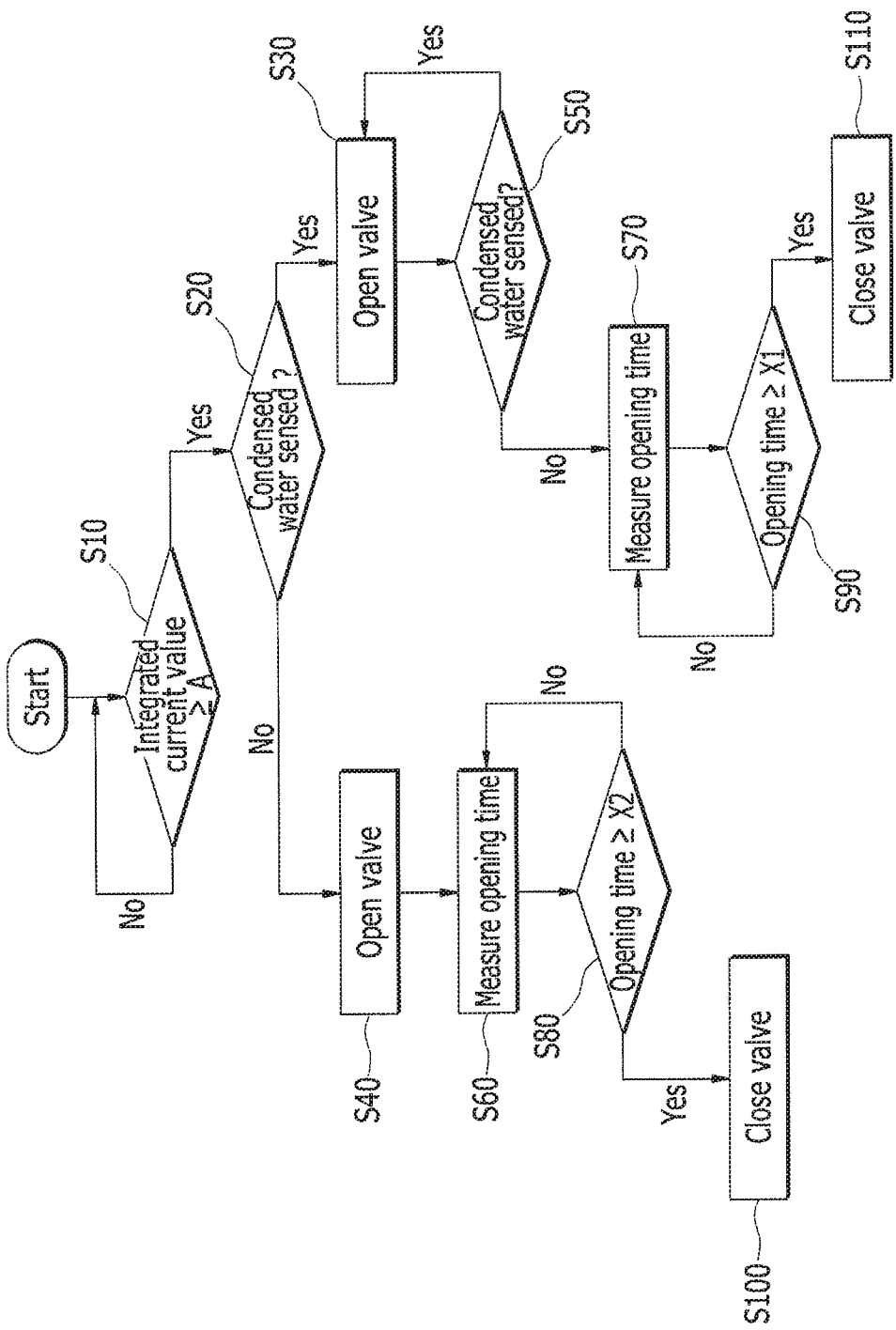
FIG. 7 shows an exemplary method of controlling an exemplary system for discharging a gas and condensed water according to an exemplary embodiment of the present invention.

FIG. 7 shows an exemplary method of controlling discharging a gas and condensed water according to an exemplary embodiment of the present invention.

The method of controlling discharging the gas and condensed water according to an exemplary embodiment of the present invention may include the step S10 of determining by the controller 40 when an integrated current value is equal to or greater than a predetermined value A, and at least one of the steps of S20 and S50 for determining by the controller 40 whether condensed water is sensed according to an output signal from the water level sensor. The control method may further include a step S30 or S40 of opening the integrated drain valve 20 by the controller 40 when the integrated current value is equal to or greater than A or when the controller 40 determines that condensed water is sensed.

Moreover, the control method may further include a step S80 or S90 of determining whether a predetermined opening time of the integrated drain valve 20 has elapsed. In addition, the control method may further include a step S100 or S110 of closing the integrated drain valve 20 by the controller 40 after the elapse of the opening time.

As described above, the integrated drain valve 20 may be opened according to an integrated current value or an output signal from the water level sensor 30. Likewise, both the integrated current value and the output signal from the water level sensor 30 may be used. In either case, whether to close the integrated drain valve 20 or not may be determined according to at least either the output signal from the water level sensor 20 or the predetermined opening time.

As shown in FIG. 7, in the control method, when the integrated current value is equal to or greater than the predetermined value A (S10) and the condensed water is sensed (S20), the integrated drain valve 20 may be opened (S30). The integrated drain valve 20 may be subsequently closed (S110) after the elapse (S90) of a predetermined first opening time of X1 seconds after the point in time (S50) when no condensed water is sensed.

On the other hand, when the integrated current value is equal to or greater than the predetermined value A (A10) and no condensed water is sensed, the integrated drain valve 20 may be opened (S40). The integrated drain valve 20 may be subsequently closed (S100) after the elapse of a predetermined second opening time of X2 seconds after it is opened.

For opening the integrated drain valve 20 according to an output signal from the water level sensor 30 which may not correspond to the exemplary embodiments shown in FIG. 7, when the condensed water is sensed, the integrated drain valve 20 may be opened. The integrated drain valve 20 may be subsequently closed after the elapse of a predetermined third opening time of X3 seconds after it is opened.

In particular, the first opening time, second opening time, and third opening time may be properly determined by experiment.

As fully described above, the present invention may reduce cost and weight by functionally integrating a drain valve and a purge valve into a single valve.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A system of discharging gas and condensed water in a fuel cell system, comprising:
   a fuel cell stack including cathodes and anodes and configured to produce an electric current by an electrochemical reaction of oxygen and hydrogen;
   a water trap configured to temporarily store gases and water discharged from anodes of the stack and condensed water;
   an integrated drain valve mounted at the water trap such that the gases and the condensed water pass through a discharge portion of the integrated drain valve and are discharged out of the water trap; and
   a controller configured to discharge the gases and the condensed water by opening and closing the integrated drain valve.

2. The gas and condensed water discharge system of claim 1, wherein the controller is configured to recognize an integrated current value by integrating a current value produced by the stack or by directly receiving an integrated current value signal directly.

3. The gas and condensed water discharge system of claim 1, further comprising:
   a water level sensor that is mounted in the water trap and senses the condensed water.

4. The gas and condensed water discharge system of claim 1, wherein a section where level of the condensed water in the water trap drops includes a section where both the gases and the condensed water are discharged through the discharge portion.

5. The gas and condensed water discharge system of claim 1, wherein an inlet surface of the discharge portion of the integrated drain valve is parallel or substantially parallel with a level surface of the condensed water.

6. The gas and condensed water discharge system of claim 3, wherein the controller is configured to open the integrated drain valve when an integrated current value which is an integrated value of a current produced by the stack is equal to or greater than a predetermined value, and close the integrated drain valve by determining whether to close the integrated drain valve using at least one of an output signal from the water level sensor and a predetermined opening time.

7. The gas and condensed water discharge system of claim 3, wherein the controller is configured to open the integrated drain valve according to an output signal from the water level sensor, and close the integrated drain valve by determining whether to close the integrated drain valve using at least one of an output signal from the water level sensor and a predetermined opening time.

\* \* \* \* \*